United States Patent
Deshmukh et al.

(10) Patent No.: US 11,233,748 B1
(45) Date of Patent: Jan. 25, 2022

(54) BANDWIDTH MANAGEMENT FOR RESOURCE RESERVATION LABEL SWITCHED PATH OF A RING NETWORK

(71) Applicant: Juniper Networks, Inc., Sunnyvale, CA (US)

(72) Inventors: Abhishek Deshmukh, Wilmington, MA (US); Kireeti Kompella, Los Altos, CA (US); Ravi Singh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 217 days.

(21) Appl. No.: 16/117,059

(22) Filed: Aug. 30, 2018

(51) Int. Cl.
| | |
|---|---|
| *H04L 12/911* | (2013.01) |
| *H04L 12/24* | (2006.01) |
| *H04L 12/54* | (2013.01) |
| *H04L 12/723* | (2013.01) |
| *H04L 12/70* | (2013.01) |

(52) U.S. Cl.
CPC .......... *H04L 47/72* (2013.01); *H04L 12/5601* (2013.01); *H04L 41/0896* (2013.01); *H04L 45/50* (2013.01); *H04L 2012/5612* (2013.01); *H04L 2012/5643* (2013.01)

(58) Field of Classification Search
CPC . H04L 47/72; H04L 12/5601; H04L 41/0896; H04L 45/50; H04L 2012/5612; H04L 2012/5643
USPC ................................. 709/217, 226
See application file for complete search history.

(56) References Cited

U.S. PATENT DOCUMENTS

| | | |
|---|---|---|
| 6,904,018 B2 | 6/2005 | Lee et al. |
| 6,999,436 B2 | 2/2006 | Zheng et al. |
| 7,006,499 B2 | 2/2006 | Tingle et al. |

(Continued)

FOREIGN PATENT DOCUMENTS

| | | |
|---|---|---|
| CN | 1401497 A | 3/2003 |
| CN | 101075973 A | 11/2007 |

(Continued)

OTHER PUBLICATIONS

Byun, Haesun, and Meejeong Lee. "An NSIS based resource reservation protocol for hose model VPN service." In 2008 10th International Conference on Advanced Communication Technology, vol. 1, pp. 207-211. IEEE, 2008. (Year: 2008).*

(Continued)

*Primary Examiner* — Suraj M Joshi
*Assistant Examiner* — Melaku Y Habtemariam
(74) *Attorney, Agent, or Firm* — Shumaker & Sieffert, P.A.

(57) ABSTRACT

Techniques are described for managing a plurality of requests for a change in bandwidth for a resource reservation label switched path ("LSP") of a ring network. For example, a method may include receiving, by a network device and from an egress network device of a ring network, a resource reservation request message to establish a multipoint-to-point (MP2P) ring label switched path (LSP). The method may also include modifying, by the network device, the resource reservation request message to specify a request for a change in bandwidth for a segment from the network device to the egress network device of the MP2P ring LSP. The method may also include sending, by the network device and to a downstream network device along the MP2P ring LSP, the modified resource reservation request message.

16 Claims, 5 Drawing Sheets

(56) References Cited

U.S. PATENT DOCUMENTS

| | | | |
|---|---|---|---|
| 7,127,523 B2 | 10/2006 | Kotser et al. | |
| 7,184,437 B1 | 2/2007 | Cole et al. | |
| 7,234,079 B2 | 6/2007 | Cheng | |
| 7,366,109 B2 | 4/2008 | Ashwood-Smith | |
| 7,388,828 B2 | 6/2008 | Nakash | |
| 7,543,075 B2 | 6/2009 | Ku | |
| 7,545,735 B1 | 6/2009 | Shabtay et al. | |
| 7,602,702 B1* | 10/2009 | Aggarwal | H04L 45/00 370/217 |
| 7,623,446 B1 | 11/2009 | Allan | |
| 7,626,924 B2 | 12/2009 | Nagata et al. | |
| 7,710,970 B2 | 5/2010 | Tingle et al. | |
| 7,733,883 B2 | 6/2010 | Li et al. | |
| 7,742,482 B1 | 6/2010 | Aggarwal | |
| 7,742,484 B2 | 6/2010 | Makishima et al. | |
| 7,808,931 B2 | 10/2010 | Zelig et al. | |
| 7,936,780 B1 | 5/2011 | Kompella | |
| 7,940,698 B1* | 5/2011 | Minei | H04L 45/00 370/254 |
| 7,965,656 B1 | 6/2011 | Wijnands et al. | |
| 7,990,993 B1 | 8/2011 | Ghosh et al. | |
| 8,050,559 B2 | 11/2011 | Sindhu | |
| 8,064,440 B2 | 11/2011 | Bhaskar | |
| 8,121,121 B2 | 2/2012 | Xiao | |
| 8,218,553 B2 | 7/2012 | Kompella | |
| 8,238,229 B2 | 8/2012 | Guan | |
| 8,406,124 B2 | 3/2013 | Long et al. | |
| 8,422,361 B2 | 4/2013 | Kano | |
| 8,477,795 B2 | 7/2013 | Kini et al. | |
| 8,504,727 B2 | 8/2013 | Mohan et al. | |
| 8,576,848 B2 | 11/2013 | Saad et al. | |
| 8,588,611 B2 | 11/2013 | Long et al. | |
| 8,611,359 B1 | 12/2013 | Kompella et al. | |
| 8,855,014 B2 | 10/2014 | Previdi et al. | |
| 8,902,729 B2 | 12/2014 | Nakash | |
| 8,964,570 B2 | 2/2015 | Kumar et al. | |
| 9,071,500 B2 | 6/2015 | Fondelli et al. | |
| 9,077,561 B2 | 7/2015 | Kotrabasappa et al. | |
| 9,178,811 B2 | 11/2015 | Li | |
| 9,300,550 B2 | 3/2016 | Kompella | |
| 9,350,620 B2 | 5/2016 | Chen et al. | |
| 9,363,169 B2 | 6/2016 | Torvi et al. | |
| 9,391,883 B2 | 7/2016 | Peng | |
| 9,413,605 B2 | 8/2016 | Kompella | |
| 9,438,473 B2 | 9/2016 | Kompella | |
| 9,537,712 B2 | 1/2017 | Nainar et al. | |
| 9,692,693 B2 | 6/2017 | Kompella | |
| 9,729,455 B2 | 8/2017 | Kompella | |
| 2007/0280251 A1 | 12/2007 | Wang et al. | |
| 2012/0008632 A1 | 1/2012 | Liu et al. | |
| 2012/0207017 A1 | 8/2012 | Ceccarelli et al. | |
| 2013/0047193 A1 | 2/2013 | Finkelstein | |
| 2013/0155874 A1 | 6/2013 | Sha et al. | |
| 2014/0313886 A1 | 10/2014 | Yuan et al. | |
| 2014/0330920 A1 | 11/2014 | Shao | |
| 2015/0128223 A1 | 5/2015 | Magri et al. | |
| 2015/0381408 A1* | 12/2015 | Kompella | H04L 41/0668 370/222 |
| 2015/0381420 A1* | 12/2015 | Kompella | H04L 41/0668 370/222 |
| 2015/0381483 A1* | 12/2015 | Kompella | H04L 47/825 370/258 |
| 2015/0381500 A1* | 12/2015 | Kompella | H04L 47/20 370/231 |
| 2017/0034061 A1 | 2/2017 | Zhang | |
| 2017/0134268 A1* | 5/2017 | Easale | H04L 47/20 |

FOREIGN PATENT DOCUMENTS

| | | |
|---|---|---|
| CN | 101714940 A | 5/2010 |
| CN | 101815035 A | 8/2010 |
| CN | 102882780 A | 1/2013 |
| CN | 102971994 A | 3/2013 |
| CN | 103209088 A | 7/2013 |
| EP | 1528731 A2 | 4/2005 |
| EP | 1679842 A1 | 7/2006 |
| EP | 2224649 A1 | 9/2010 |
| WO | 0036871 A1 | 6/2000 |
| WO | 2013059966 A1 | 5/2013 |

OTHER PUBLICATIONS

Metro Ethernet Forum Technical committee: "Metro Ethernet Protection", http://metroethernetforum.org/_root/members/bostonmeeting/mef_protection_0_30.pdf, Oct. 25, 2001, 28 pp.

Yasukawa, "Supporting Multipoint-to-Point Label Switched Paths in Multiprotocol Label Switching Traffic Engineering", Network Working Group, draft-yasukawa-mpls-mp2p-rsvpte-06.txt, Oct. 19, 2009, 22 pp.

Yang et al., "Multiprotocol Label Switching Transport Profile Ring Protection Analysis", MPLS Working Group, draft-yang-mpls-tp-ring-protection-analysis-01, May 1, 2009, 11 pp.

Katz et al., "Traffic Engineering (TE) Extensions to OSPF Version 2" Network Working Group, RFC 3630, Sep. 2003, 14 pp.

Li et al., "IS-IS Extensions for Traffic Engineering" Network Working Group, RFC 5305, Oct. 2008, 17 pp.

Awduche et al. "RSVP-TE: Extensions to RSVP for LSP Tunnels," Network Working Group, RFC 3209, Dec. 2001, 61 pp.

Braden et al. "Resource ReSerVation Protocol (RSVP)—Version 1 Functional Specification," RFC 2205, Sep. 1997, 112 pp.

Deshmukh et al. "RSVP Extensions for RMR," draft-deshmukh-teas-rsvp-rmr-extension-00, Internet-Draft, IETF, Feb. 13, 2018, 15 pp.

Kompella et al. "Resilient MPLS Rings," draft-ietf-mpls-rmr-06, Internet-Draft, IETF, Jan. 3, 2018, 14 pp.

Kompella et al., "Resilient MPLS Rings," draft-ietf-mpls-rmr-07, Internet-Draft, IETF, Mar. 4, 2018, 14 pp.

Kompella et al., "RSVP Protocol Extensions for Resilient MPLS Rings," draft-deshmukh-mpls-rsvp-rmr-extension-00, IETF 98 (MPLS WG), Mar. 2017, 8 pp.

* cited by examiner

BANDWIDTH MANAGEMENT FOR RESOURCE RESERVATION LABEL SWITCHED PATH OF A RING NETWORK

TECHNICAL FIELD

The disclosure relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. To maintain an accurate representation of the network, routers typically exchange routing information in accordance with one or more defined routing protocols, such as the Border Gateway Protocol (BGP).

Multi-Protocol Label Switching (MPLS) techniques may be used to engineer traffic patterns within Internet Protocol (IP) networks. Using MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path. Routers along the path cooperatively perform MPLS operations to forward the MPLS packets along the established path. A variety of protocols exist for establishing LSPs, such as the Label Distribution Protocol (LDP) and the Resource Reservation Protocol with Traffic Engineering extensions (RSVP-TE).

A plurality of routing devices within a network may be arranged as a ring network, such as Resilient MPLS Rings (RMR) as described in K. Kompella et al., Resilient MPLS Rings," draft-ietf-mpls-rmr-07, Internet Engineering Task Force (IETF) MPLS Working Group Internet-Draft, Mar. 4, 2018. In some examples, a ring network may operate as an access network to customer networks. That is, a ring network may operate to provide fast packet-based transport of communications between customer networks connected to the ring network, and/or provide the customer networks access to public network, such as the Internet or other provider networks.

SUMMARY

In general, techniques are described for managing a plurality of requests for a change in bandwidth for a resource reservation label switched path ("LSP") of a ring network. For example, the techniques provide for hop-by-hop management of bandwidth requests from network devices along a multipoint-to-point (MP2P) label switched path signaled in a ring network (referred to herein as "MP2P ring LSP"). One or more network devices, e.g., routers, of the ring network may request a respective change in bandwidth for the MP2P ring LSP. To request a change in bandwidth, a router of the ring network may, e.g., modify an incoming resource reservation request message (e.g., RSVP PATH message) to include a respective bandwidth request, e.g., sender template objects, that uniquely identifies a respective request for a change in bandwidth of the MP2P ring LSP, and sends the modified resource reservation request message downstream.

Each downstream router determines whether its links have reservable bandwidth available for the bandwidth requests specified by sender template objects in the modified resource reservation request message. In response to determining that the downstream router has reservable bandwidth available, the downstream router sends the modified resource reservation request message downstream toward the egress router of the MP2P ring LSP. As one example, the downstream router may determine that its links have reservable bandwidth available for one bandwidth request and insufficient reservable bandwidth for another bandwidth request. In this example, the downstream router sends the modified resource reservation request message with the sender template object that uniquely identifies the bandwidth request for which the downstream router has reservable bandwidth and sends an error message for the bandwidth request for which the downstream router has insufficient reservable bandwidth.

The egress router of MP2P ring LSP may receive the modified resource reservation request message and send a resource reservation response message (e.g., RSVP RESV message) with the requested bandwidth for each of the requests received (e.g., as specified by each of the sender template objects received). In some examples, the resource reservation response message includes a successful request indicator such as a filter specification object corresponding to each of the one or more sender template objects received from the modified resource reservation request message. The filter specification object may inform the upstream routers of the requests that were successful. The resource reservation response message also includes a flow specification object that specifies the requested bandwidth.

In one example, a method includes receiving, by a network device and from an egress network device of a ring network, a resource reservation request message to establish a multipoint-to-point (MP2P) ring label switched path (LSP). The method also includes modifying, by the network device, the resource reservation request message to specify a request for a change in bandwidth for a segment from the network device to the egress network device of the MP2P ring LSP. The method also includes sending, by the network device and to a downstream network device along the MP2P ring LSP, the modified resource reservation request message.

In another example, a method includes receiving, by an egress network device of a ring network, a resource reservation request message to establish a multipoint-to-point (MP2P) ring label switched path (LSP), wherein the resource reservation request message has been modified to specify a plurality of requests for a change in bandwidth of the MP2P ring LSP. The method also includes sending, by the egress network device, a resource reservation response message, wherein the resource reservation response message comprises a plurality of reservable bandwidth indicators that indicates the plurality of requests for the change in bandwidth were successful.

In yet another example, a network device includes a plurality of physical interfaces for receiving traffic from two or more network devices of a plurality of network devices in a ring network. The network device also includes one or more processors configured to: receive, from an egress network device of a ring network, a resource reservation request message to establish a multipoint-to-point (MP2P) ring label switched path (LSP); modify the resource reservation request message to specify a request for a change in bandwidth for a segment from the network device to the egress network device of the MP2P ring LSP; and send the modified resource reservation request message to a downstream network device along the MP2P ring LSP.

The details of one or more examples are set forth in the accompanying drawings and the description below. Other features, objects, and advantages will be apparent from the description and drawings, and from the claims.

DETAILED DESCRIPTION

Figure 1:
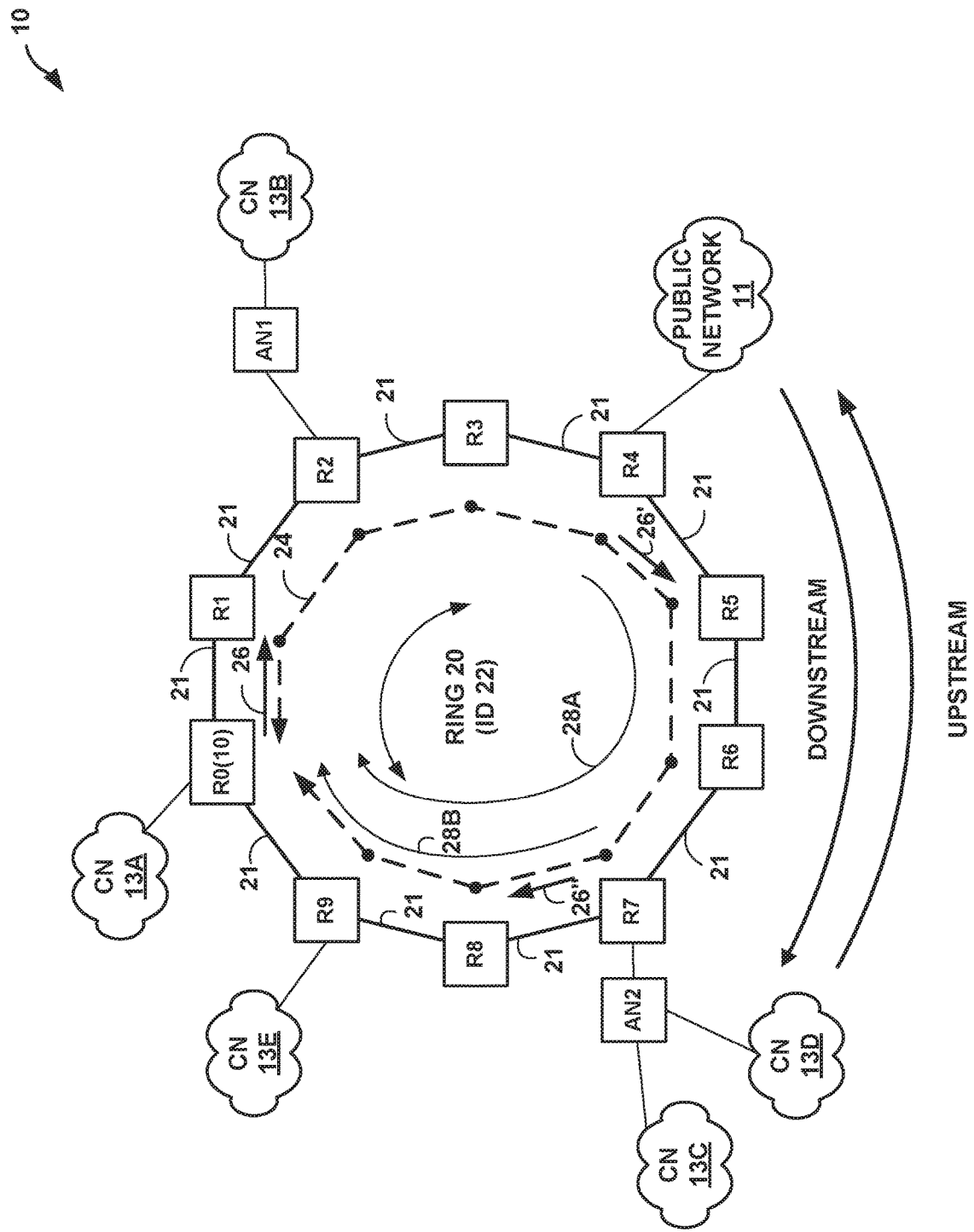
FIG. 1 is a block diagram illustrating an example network system for managing bandwidth of a resource reservation label switched path (LSP) in a ring network, in accordance with aspects of techniques described herein.

FIG. 1 is a block diagram illustrating an example network system 10 for managing a plurality of requests for a change in bandwidth of a resource reservation label switched path (LSP) of a ring network, in accordance with aspects of techniques described herein. As shown in the example of FIG. 1, network system 10 includes a collection of routers ("R"), e.g., R0-R9, that are arranged to form ring network 20. As shown in FIG. 1, ring network 20 operates as an access network for a plurality of customer networks 13A-13E. That is, ring network 20 operates to provide fast packet-based transport of communications between customer networks 13, and/or provide the customer networks access to public network, e.g., public network 11, such as the Internet or other provider networks.

Each of customer networks 13 may comprise a private network and may include local area networks (LANs) or wide area networks (WANs) that comprise a plurality of subscriber devices (not shown), such as personal computers, laptops, workstations, personal digital assistants (PDAs), wireless devices, network-ready appliances, file servers, print servers or other devices. In some cases, the subscriber devices request and communicate multicast streams.

In general, the routers R0-R9 within ring network 20 use the multi-protocol label switching (MPLS) signaling mechanisms described herein to specify and signal "MPLS rings" (e.g., Resilient MPLS Rings) and membership therein. As a result, the routers automatically establish label switched paths (LSPs) as components of the MPLS rings for packet transport within ring network 20. These LSPs may be traffic engineered.

As described herein, in example implementations an MPLS ring can be defined as follows. Given a graph G=(V, E), where V is a set of vertices (or nodes) and E a set of directed edges (or links), a ring R, such as ring network 20, is a sequence of nodes <R0, R1, R2, . . . , Rn>, where n is the number of ring nodes in the ring. A ring node is a router; the links are interfaces between routers (e.g., links 21). As used herein, R0 is the hub node for a given MPLS ring, and can also be represented as Rn. That is, the hub node for an MPLS ring is both the zeroth and nth node in the MPLS ring.

In the example of FIG. 1, MPLS ring for ring network 20 has a hub node at a respective router R0 that may also be referred to as router R10 (denoted "R0(10)"), since n=10 in the example ring network. For each node i within the sequence of nodes, link (Ri, R(i+1)) and link (R(i+1), Ri) are both in the set of links E. That is, each node in a given MPLS ring is adjacent to the next and previous node in the ring by a pair of bidirectional links. Indices of adjacent nodes in the MPLS ring, other than the hub nodes, differ in this example by an increment of one and increase in a downstream (DS) direction (clockwise in the example of FIG. 1) from hub node R0 to node R(n−1). The other direction is, by way of example, represented as the upstream direction (counterclockwise). For example, in the example of FIG. 1, communications flowing in the downstream direction for the MPLS ring of ring network 20 traverse routers R0-R9 in a clockwise direction as this is the direction in which indices of the routers are defined in increasing order. Additional examples of ring networks are further described in U.S. Pat. No. 9,413,605, entitled "PATH PROTECTION FOR RING-BASED MULTI-PROTOCOL LABEL SWITCHED PATHS," and Kompella, K., et. al., "Resilient MPLS Rings," draft-ietf-mpls-rmr-06, Internet-Draft, Jan. 3, 2018, the entire contents of each of which are incorporated by reference herein.

The MPLS ring for ring network 20 is identified by a ring identifier that is unique across a service provider (SP) network or an administrative domain. In this example of FIG. 1, ring network 20 is assigned ring identifier 22. An MPLS ring may be constructed by assigning a ring identifier and index to each of the nodes that form the MPLS ring, and assigning a ring identifier to links between ring nodes that are to be used to carry traffic for the MPLS ring. In some examples herein, ring links between a pair of ring nodes may be treated as a single link, although these links may be bundled at the layer two (2) (e.g., as a Link Aggregation Group), or explicitly bundled at the layer three (L3) as a link bundle, or implicitly bundled by virtue of having the same ring identifier.

An administrator or network management system may manually define an MPLS ring, such as by assigning a new, unallocated ring identifier, assigning a hub node (e.g., router R0), and assigning the links that belong to the MPLS ring. Routers may also automatically define an MPLS ring by way of discovery using, for example, extensions to an interior gateway protocol (IGP). As one example, IGP may be used to discover ring neighbors and ring interfaces. Based on network topology, each node may autonomously elect or may be configured to specify, which of its individual interfaces are coupled to links that form an MPLS ring being established. Using IGP, for example, each router R0-R9 of ring network 20 declares itself as a member of the MPLS ring and announces its ring identifier for the MPLS ring for which it is a member. Hub router R0 for the MPLS ring also declares, based on discovered neighbors, itself as the largest index in the ring (R0→Rn), which allows the MPLS ring to dynamically form as a closed loop.

In many cases, upon defining an MPLS ring, a service provider network may include other non-ring nodes, such as service nodes and access nodes, that may be attached to, but not be part of, the MPLS ring. In the example of FIG. 1, network system 10 includes access nodes AN1 that is single-homed to router R2 and AN2 that is single-homed to router R7. Although not shown in FIG. 1, other non-ring nodes may be connected to customer networks 13A-13E and public network 11. These non-ring nodes may be one or more hops away from an MPLS ring.

In example implementations, a ring LSP signaled by the routers starts and ends at the same router (or ring node) Ri. As used herein, Ri is an anchor router for the ring LSP, i.e., where the ring LSP starts and ends. Each router is an anchor for one of the n ring LSPs defined on a ring with n nodes. Each anchor node creates an LSP addressed to itself. This ring LSP may contain a pair of counter-rotating unicast LSPs.

One example of a ring LSP described herein is a multipoint-to-point (MP2P) ring LSP (which may also be referred to as an "MP2P tunnel") that starts on any ring node of the MPLS ring and ends on a single ring node of the MPLS ring. In the example of FIG. 1, the MPLS ring constructed for ring network 20 includes MP2P ring LSP 24 that starts and ends with router R0. That is, MP2P ring LSP 24 comprises two counter-rotating unicast LSPs in which router R0 is the egress. Traffic may enter ring network 20 from any of routers R1-R9, and is sent towards egress router R0 either in a clockwise direction or counter-clockwise direction, or both, on MP2P ring LSP 24.

Since, in this example implementation, MP2P ring LSP 24 is a bidirectional, multipoint-to-point LSP, MP2P ring LSP 24 allows any of the routers (e.g., routers R1-R9) within ring network 20 to operate as an ingress to source packet traffic into the MP2P ring LSP 24 for transporting to egress router R0 in an upstream direction and/or downstream direction around ring network 20. As one example, downstream traffic being added to the ring may arrive at router R4 from non-ring nodes connected to router R4. Downstream traffic arrives at each router in ring network 20 (i.e., routers R5-R9) from its upstream neighbor on one or more interfaces selected as components of the ring. Egress router R0 of MP2P ring LSP 24 receives the traffic from its upstream neighbors (i.e., routers R1 and/or R9) and sends the traffic to non-ring nodes connected to and reachable through router R0 (e.g., customer network 13A via router R0).

Although ring network 20 is illustrated as including a single MP2P ring LSP 24, ring network 20 may, in some examples, include multiple MP2P rings. In this case, each of the MP2P rings have its own set of ring LSPs terminating on the relevant nodes acting as egress routers. For example, a second MP2P ring LSP (not shown) may be established with router R2 in which the second MP2P ring LSP terminates on egress router R2 for the second MP2P ring LSP.

When establishing one or more ring LSPs of ring network 20, each of routers R0-R9 learns, either through auto-discovery described above or configuration, that it is a router of a defined ring. Each of routers R0-R9 is able to learn the index for other routers on the ring and is able to autonomously select the interfaces and links to be used for the ring. In addition, each of routers R0-R9 autonomously signals each individual ring LSP of the ring network. For example, anchor router R0 may use a resource reservation protocol such as the Resource Reservation Protocol with Traffic Engineering extensions (RSVP-TE) to establish MP2P ring LSP 24 that extends from any of the routers in ring network 20 to egress router R0. Further examples of RSVP-TE are described in D. Awduche et. al, "RSVP-TE: Extensions to RSVP for LSP Tunnels," Request for Comments 3209, December 2001, the entire contents being incorporated by reference herein.

In the example of FIG. 1, router R0 may maintain routing communication sessions with peer routers (e.g., routers R1-R9) and output control-plane messages, e.g., resource reservation request messages (e.g., RSVP PATH messages) and resource reservation response messages (e.g., RSVP RESV messages) to signal membership of ring LSPs. For illustrative purposes, FIG. 1 is described with respect to the RSVP-TE protocol, but routers R0-R9 may use other label distribution protocol mechanisms, e.g., Label Distribution Protocol (LDP), for establishing the MP2P ring LSP 24.

In signaling MP2P ring LSP 24, router R0, operating as an anchor router, may create two resource reservation request messages traveling in opposite directions. That is, resource reservation request messages, e.g., RSVP PATH messages, are sent in a downstream direction (clockwise or counter-clockwise) and contain a label request and any traffic specification (TSPEC) for the data to be carried by the ring LSP. Egress router R0 may insert its own address in a field (e.g., session object) of the RSVP PATH message such that the RSVP PATH messages are addressed to router R0 (i.e., the originating node) of the ring LSP. In this way, the RSVP PATH messages automatically create the upstream LSP of the bidirectional ring LSP, e.g., MP2P ring LSP 24.

When egress router R0 receives the RSVP PATH message after traversing ring network 20, router R0 replies with a resource reservation response message, e.g., RSVP RESV message, following the path state created by the RSVP PATH message, in reverse order (i.e., upstream direction), back to router R0. The RSVP RESV messages may advertise a label for the sending router and automatically create the downstream LSP of MP2P ring LSP 24.

In the example of FIG. 1, routers R4 and R7 may operate as ingresses and may want to forward traffic on MP2P ring LSP 24 destined for non-ring nodes connected to and reachable through router R0 (e.g., nodes in customer network 13A). In this example, ingress routers R4 and R7 may each request for an increase in bandwidth and/or a change in the existing bandwidth. For example, ingress router R4 may request a first amount of bandwidth to forward traffic on MP2P ring LSP 24 to egress router R0. Ingress router R7 may request a second amount of bandwidth to forward traffic on MP2P ring LSP 24 to egress router R0. In some cases, the first and second amounts of bandwidth requested from routers R4 and R7 may differ. That is, bandwidth requests on MP2P ring LSP 24 may vary from hop-to-hop in ring network 20.

Traditionally, resource reservation protocols (e.g., RSVP) do not allow for an LSP having varying bandwidth hop-to-hop. That is, without the techniques described in this disclosure, an LSP is limited to providing the same amount of bandwidth from ingress to egress, i.e., a single amount of bandwidth that does not vary along segments of the LSP. In contrast, the techniques of this disclosure allow for an LSP to be signaled using multiple sender template objects which allows varying bandwidth amounts to be reserved along different segments of the single LSP. In accordance with the techniques of this disclosure, each router that requests a change in bandwidth may modify an existing resource reservation request message to include one or more sender template objects that uniquely identifies respective the respective requests for a particular segment of the MP2P ring LSP, in accordance with the techniques described herein. For example, each router that requests a change in bandwidth (e.g., routers R4 and R7) may include a respective sender template object to an incoming resource reservation request message to indicate a respective request for bandwidth for a particular segment of the MP2P ring LSP 24. Each of the sender template objects may include, for example, a sender address identifying the sender router and a unique LSP identifier ("LSP ID") that uniquely identifies the respective request for a change in bandwidth for a particular segment of MP2P ring LSP 24.

In the example of FIG. 1, egress router R0 may establish MP2P ring LSP 24 by signaling RSVP PATH message 26 in a downstream (i.e., clockwise) direction. In this example, the segment from routers R0-R4 does not request for bandwidth. Router R0 may originate RSVP PATH message 26 including a sender template object to indicate a request for zero bandwidth. The sender template object of RSVP PATH message 26 may include a sender address of router R0 and a unique LSP identifier (e.g., LSP_ID=1) that uniquely identifies the request for zero bandwidth for a particular segment (e.g., routers R0-R4) on MP2P ring LSP 24. Routers R1-R3 may each receive RSVP PATH message 26 and include a respective sender template object with a sender address of itself, and LSP_ID=1, to specify a zero bandwidth request for routers R0-R3. An example sender template list outputted from router R3 is illustrated below:

```
SENDER_TEMPLATE_0 : SENDER_ADDRESS = R0, LSP_ID = 1
SENDER_TEMPLATE_1 : SENDER_ADDRESS = R1, LSP_ID = 1
SENDER_TEMPLATE_2 : SENDER_ADDRESS = R2, LSP_ID = 1
SENDER_TEMPLATE_3 : SENDER_ADDRESS = R3, LSP_ID = 1
```

Ingress router R4 may request a change in bandwidth for segment 28A (e.g., routers R4 to egress) on MP2P ring LSP 24. For example, router R4 may request an increase in bandwidth, e.g., 1 gigabyte, for segment 28A on MP2P ring LSP 24 to send traffic to egress router R0. To request for a change in bandwidth, router R4 may, in response to receiving RSVP PATH message 26, modify RSVP PATH message 26 (illustrated in FIG. 1 as RSVP PATH message 26') to include a sender template object that uniquely identifies router R4's request for 1 gigabyte of bandwidth on MP2P ring LSP 24 for segment 28A. For example, router R4 may copy the incoming RSVP PATH message 26 for MP2P ring LSP 24 and modify the copied RSVP PATH message by including a sender template object having a sender address as a loopback address of router R4 and a different LSP identifier, LSP_ID=X+1 (e.g., shown below as "LSP_ID=2"), to indicate a request for a change in bandwidth on MP2P ring LSP 24 for segment 28A. That is, the presence of a sender template object having a different LSP identifier may provide an indication of a unique request for a change in bandwidth from an ingress router of MP2P ring LSP 24. Router R4 may also modify the TSPEC object associated with the sender template object, which may specify the amount of bandwidth requested, e.g., 1 gigabyte. An example of the sender template list in RSVP PATH message 26' (as shown below) may include two sender template objects in RSVP PATH message 26: (1) a sender template object as "SENDER_TEMPLATE_4: SENDER_ADDRESS=R4, LSP_ID=1" that indicates a request for zero bandwidth for the segment from routers R0-R4, and (2) a sender template object as "SENDER_TEMPLATE_4 SENDER_ADDRESS=R4, LSP_ID=2" that indicates a request for 1 gigabyte of bandwidth on MP2P ring LSP 24 for segment 28A.

```
SENDER_TEMPLATE_0 : SENDER_ADDRESS = R0, LSP_ID = 1
SENDER_TEMPLATE_1 : SENDER_ADDRESS = R1, LSP_ID = 1
SENDER_TEMPLATE_2 : SENDER_ADDRESS = R2, LSP_ID = 1
SENDER_TEMPLATE_3 : SENDER_ADDRESS = R3, LSP_ID = 1
SENDER_TEMPLATE_4 : SENDER_ADDRESS = R2, LSP_ID = 1
SENDER_TEMPLATE_4 : SENDER_ADDRESS = R2, LSP_ID = 2
```

Router R4 may send RSVP PATH message 26' to a downstream neighbor, e.g., router R5. The routers that are downstream of router R4, e.g., routers R5-R9, may each include two sender template objects for each of the requests for bandwidth. For example, in response to receiving RSVP PATH message 26', each of routers R5-R9 may include a sender template object with a sender address of the router and LSP_ID=1 for the segment from R0 to itself and another sender template object with a sender address of the router and LSP_ID=2 that indicates a request for 1 gigabyte bandwidth for segment 28A.

In some examples, ingress router R4 may alter the previously requested bandwidth on MP2P ring LSP 24 for segment 28A. As one example, ingress router R4 may request an increase of bandwidth from 1 gigabyte to 2 gigabytes on MP2P ring LSP 24 for segment 28A. To request this change in bandwidth, router R4 may include a new sender template object that indicates a request for 2 gigabytes of bandwidth on MP2P ring LSP 24 for segment 28A. For example, router R4 may copy an incoming RSVP PATH message 26 for MP2P ring LSP 24 and modify the copied RSVP PATH message by including a new sender template object having a sender address as a loopback address of router R4 and a different LSP identifier, LSP_ID=X+2 (e.g., shown below as "LSP_ID=3"), for segment 28A. For example, router R4 may include two sender template objects in the sender template list in RSVP PATH message 26' (as shown below): (1) a sender template object as "SENDER_TEMPLATE_5: SENDER_ADDRESS=R2, LSP ID=1" that indicates no bandwidth is requested for the segment from routers R0-R4, and (2) a sender template object as "SENDER_TEMPLATE_5: SENDER_ADDRESS=R2, LSP ID=3" that indicates there is a request for 2 gigabytes of bandwidth on MP2P ring LSP 24 for segment 28A. Router R4 may also modify the TSPEC object associated with the sender template object, which specifies the amount of bandwidth requested, e.g., 2 gigabytes.

```
SENDER_TEMPLATE_0 : SENDER_ADDRESS = R0, LSP_ID = 1
SENDER_TEMPLATE_1 : SENDER_ADDRESS = R1, LSP_ID = 1
SENDER_TEMPLATE_2 : SENDER_ADDRESS = R2, LSP_ID = 1
SENDER_TEMPLATE_3 : SENDER_ADDRESS = R3, LSP_ID = 1
SENDER_TEMPLATE_4 : SENDER_ADDRESS = R4, LSP_ID = 1
SENDER_TEMPLATE_4 : SENDER_ADDRESS = R4, LSP_ID = 3
```

Assume for example that router R7 may also operate as an ingress to MP2P ring LSP 24. In this example, router R7 may request 1 gigabyte of bandwidth for segment 28B (e.g., router R7 to egress) on MP2P ring LSP 24. For example, in response to receiving RSVP PATH message 26', router R7 may modify RSVP PATH message 26' (illustrated in FIG. 1 as RSVP PATH message 26") to include a sender template object that uniquely identifies the request for 1 gigabyte of bandwidth on MP2P ring LSP 24 for segment 28B. For example, router R7 may copy the incoming RSVP PATH message 26' for MP2P ring LSP 24 and modify the copied RSVP PATH message by including a sender template object having a sender address as the loopback address of router R7 and a different LSP identifier, LSP_ID=Y+1 (e.g., shown below as "LSP_ID=11"), for segment 28B. The presence of a sender template having a different LSP identifier (i.e., LSP_ID=11) may provide an indication of a unique request for a change in bandwidth from an ingress router of MP2P ring LSP 24. Router R7 may also modify the TSPEC object associated with the sender template object, which specifies the amount of bandwidth requested, e.g., 1 gigabyte. An example of the sender template list in RSVP PATH message 26" (as shown below) may include three sender template objects in RSVP PATH message 26": (1) a sender template object as "SENDER_TEMPLATE_7: SENDER_ADDRESS=R7, LSP ID=1" that indicates that there is no request for a change in bandwidth for the segment from routers R0-R4; (2) a sender template object as "SENDER_TEMPLATE_7: SENDER_ADDRESS=R7, LSP_ID=3" that corresponds to a request for 2 gigabyte of bandwidth on MP2P ring LSP 24 for segment 28A; and (3) a sender template object as "SENDER_TEMPLATE_7: SENDER_ADDRESS=R7, LSP_ID=11" that corresponds to a request for 1 gigabyte of bandwidth on MP2P ring LSP 24 for segment 28B.

```
SENDER_TEMPLATE_0 : SENDER_ADDRESS = R0, LSP_ID = 1
SENDER_TEMPLATE_1 : SENDER_ADDRESS = R1, LSP_ID = 1
SENDER_TEMPLATE_2 : SENDER_ADDRESS = R2, LSP_ID = 1
SENDER_TEMPLATE_3 : SENDER_ADDRESS = R3, LSP_ID = 1
SENDER_TEMPLATE_4 : SENDER_ADDRESS = R4, LSP_ID = 1
SENDER_TEMPLATE_4 : SENDER_ADDRESS = R4, LSP_ID = 3
SENDER_TEMPLATE_5 : SENDER_ADDRESS = R5, LSP_ID = 1
SENDER_TEMPLATE_5 : SENDER_ADDRESS = R5, LSP_ID = 3
SENDER_TEMPLATE_6 : SENDER_ADDRESS = R6, LSP_ID = 1
SENDER_TEMPLATE_6 : SENDER_ADDRESS = R6, LSP_ID = 3
SENDER_TEMPLATE_7 : SENDER_ADDRESS = R4, LSP_ID = 1
SENDER_TEMPLATE_7 : SENDER_ADDRESS = R4, LSP_ID = 3
SENDER_TEMPLATE_7 : SENDER_ADDRESS = R4, LSP_ID = 11
```

Router R7 may send RSVP PATH message 26" to a downstream neighbor, e.g., router R8. The routers that are downstream of a router requesting for bandwidth (e.g., routers R8-R9) may also include three sender template objects for each request for a change in bandwidth, e.g., the request for zero bandwidth for the segment from R0 to itself, the request for 2 gigabytes of bandwidth for segment 28A, and the request for 1 gigabyte of bandwidth for segment 28B. For example, in response to receiving RSVP PATH message 26", each of routers R8-R9 may include a sender template object with a sender address of itself and LSP_ID=1 for the segment from R0 to itself, another sender template object with a sender address of itself and LSP_ID=3 to indicate a request for bandwidth for segment 28A, and another sender template object with a sender address of itself and LSP_ID=11 to indicate a request for bandwidth for segment 28B.

Each downstream router to the router requesting bandwidth (e.g., routers R8-R9) may also determine whether there is reservable bandwidth available to be allocated for the one or more requests for a change in bandwidth included in a resource reservation request message (i.e., as indicated by the one or more sender template objects). As one example, router R8 may, in response to receiving RSVP PATH message 26", determine whether one or more links of router R8 have reservable bandwidth available for the requests. In this example, downstream router R8 may, in response to receiving RSVP PATH message 26", determine that its 2 gigabyte link has reservable bandwidth available for sender template objects for LSP_ID=1 (i.e., the request for zero bandwidth) and LSP_ID=3 (i.e., the request for 2 gigabytes of bandwidth for segment 28A), but insufficient reservable bandwidth for the sender template objects for LSP_ID=11 (i.e., the request for 1 gigabyte of bandwidth for segment 28B). In this example, router R8 may determine that its links have capacity for the request for 2 gigabytes of bandwidth for segment 28A, but insufficient reservable bandwidth for the request for 1 gigabyte of bandwidth for segment 28B.

In response to determining that there is insufficient reservable bandwidth for segment 28B (e.g., as specified in sender template objects having LSP_ID=11), router R8 may send an error message back to the requesting router, e.g., router R7. For example, router R8 may send to router R7 an RSVP PathErr message by identifying the failed request (i.e., by including SENDER_TEMPLATE_7: SENDER_ADDRESS=R7, LSP_ID=11) to router R7. Router R7 may receive the RSVP PathErr message and determine based on the inclusion of the sender template object that the request for a change in bandwidth has failed.

In response to determining that there is reservable bandwidth available for the requests specified by sender template objects for LSP_ID=1 and LSP_ID=3, router R8 may forward the RSVP PATH message 26" with the sender template objects for LSP_ID=1 and LSP_ID=3 towards egress router R0. That is, downstream routers may forward a resource reservation request message with the sender template objects that specify the successful requests and remove the sender template objects that specify the unsuccessful requests (i.e., sender template objects having LSP_ID=11).

If reservable bandwidth is available all the way to egress router R0, egress router R0 of MP2P ring LSP 24 may receive RSVP PATH message 26" including the sender template objects that specify the successful bandwidth requests, e.g., sender template objects for LSP_ID=1 and LSP_ID=3. In response to receiving the RSVP PATH message with the sender template objects, egress router R0 may generate a resource reservation response message (e.g., RSVP RESV message) with corresponding bandwidth requirements. For example, RSVP RESV message may include one or more successful request indicators such as a flow descriptor object that contains bandwidth information and a filter specification object that identifies the sender by using the information included in the sender template object (i.e., sender ID (sender address) and LSP_ID) of RSVP PATH message 26". For example, the filter specification object may include the sender address and LSP_ID of each sender template object in the RSVP PATH message. The RSVP RESV message may also include a flow specification object including the requested bandwidth as defined in the TSPEC object of the RSVP PATH message.

In the example of FIG. 1, egress router R0 may send an RSVP RESV message including a filter specification object corresponding to sender template objects for LSP_ID=1 and LSP_ID=3. The RSVP RESV message may also include flow specification objects specifying the request for 2 gigabytes as specified in the TSPEC object included with sender template objects with LSP_ID=3. As each upstream router receives the RSVP RESV message, the upstream router removes information corresponding to itself before sending the RSVP RESV message upstream following the path state created by the RSVP PATH message, in reverse order back to router R0. For example, each of routers R1-R9, in reverse order, may receive the RSVP RESV message and removes the filter specification object corresponding to the sender template object that the router included in the modified resource reservation request message. The router may also allocate bandwidth according to the requested bandwidth specified in the flow specification object. In this way, routers R1-R9 may each allocate respective bandwidths for the corresponding bandwidth requests as indicated by sender template objects included in a resource reservation request message.

In some examples in which the bandwidth is to be removed, e.g., router R4, router R4 may send an RSVP PATH message including a new sender template object that indicates a request for zero bandwidth. For example, after bandwidth increase is successful, router R4 has a sender address of router R4 and LSP_ID=3. To remove the bandwidth, router R4 may modify a resource reservation request message to include a new sender template object having a different LSP identifier (e.g., LSP_ID=4). In response, each downstream router that receives the RSVP RESV message removes the bandwidth previously allocated on the corresponding link (i.e., for LSP_ID=3).

In this way, the techniques may provide one or more technical advantages. For example, the techniques described herein may provide for hop-by-hop management of a plurality of requests for a change in bandwidth of a resource reservation ring LSP. Moreover, each router in ring network 20 does not change any label associated with MP2P ring LSP 24 such that the label remains consistent with the label initially signaled.

Figure 2:
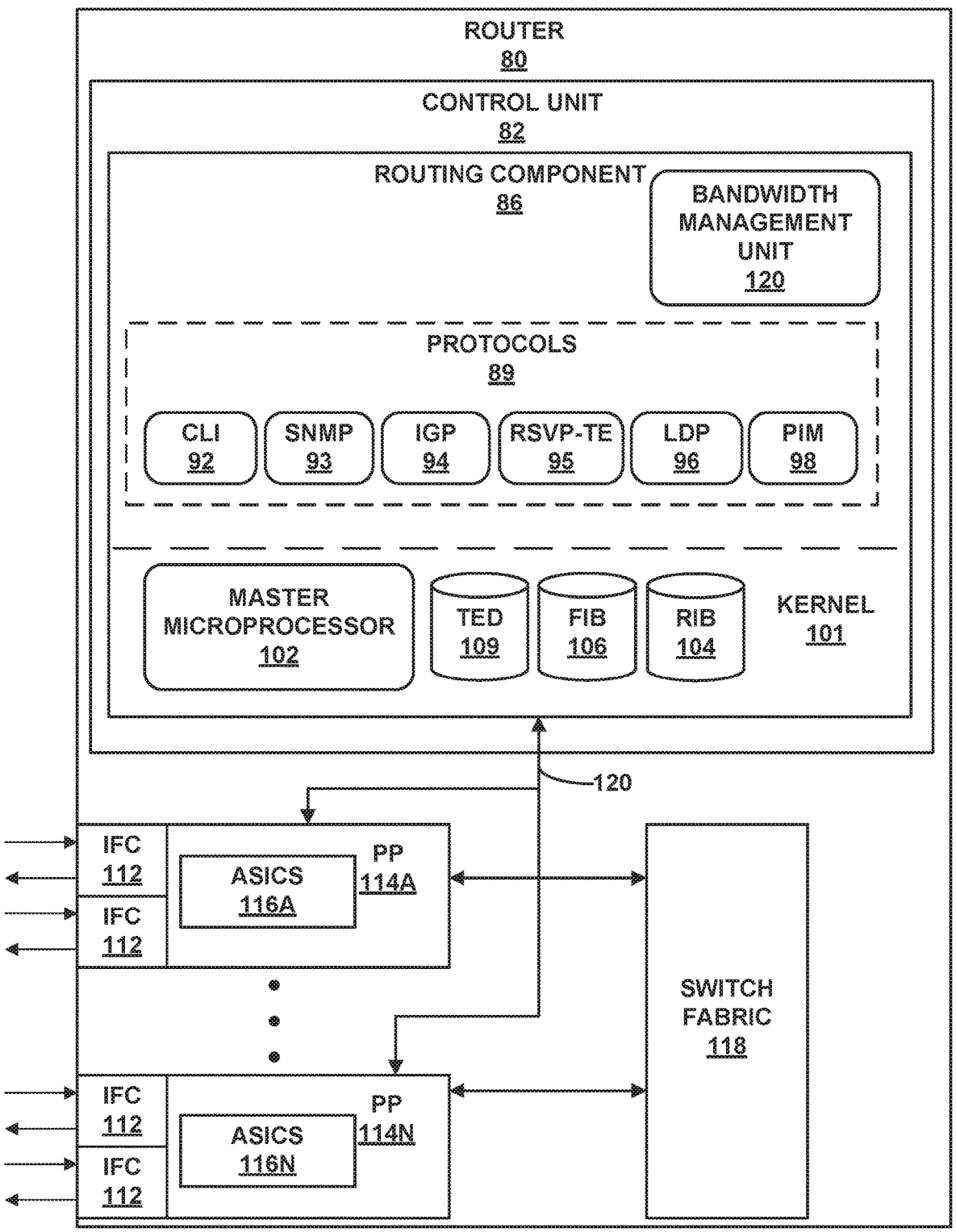
FIG. 2 is a block diagram illustrating an example device, e.g., a router, capable of implementing the techniques described herein.

FIG. 2 is a block diagram illustrating an example device, e.g., a router, capable of implementing the techniques described herein. Router 80 may comprise a gateway, an edge or access router, a core router, a switch or other device that forwards MPLS traffic using ring LSPs in accordance with the techniques described herein. Router 80 is described for purposes of example with respect to any of routers R0-R9 of FIG. 1.

In the example of FIG. 2, router 80 includes control unit 82 in which routing component 86 provides control plane functionality for router 80. Router 80 also includes a plurality of packet processors 114A-114N ("PPs 114"), such as packet-forwarding engines, and a switch fabric 118 that collectively provide a forwarding plane (otherwise referred to as "data plane") for forwarding network traffic. PPs 114 receive and send data packets via interface cards 112 ("IFCs 112"). In other embodiments, each of PPs 114 may comprise more or fewer IFCs. Although not shown, PPs 114 may each comprise a central processing unit (CPU) and a memory. In this example, routing component 86 is connected to each of PPs 114 by a dedicated internal communication link 120. For example, dedicated link 120 may comprise a Gigabit Ethernet connection. Switch fabric 118 provides a high-speed interconnect for forwarding incoming data packets between PPs 114 for transmission over a network. For example, router 80 may be a multi-chassis router in which a multi-stage switch fabric, such as a 3-stage Clos switch fabric, is used as a high-end forwarding plane to relay packets between multiple routing nodes of the multi-chassis router.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 93 ("SNMP 93") comprises an SNMP agent that receives SNMP commands from a management entity to set and retrieve configuration and management information for router 80. Using CLI 92 and SNMP 93, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In some examples, router 80 may also maintain a label FIB storing MPLS labels, which may be a separate data structure or part of FIB 106. In general, the routing information represents the overall topology of the network. IGP 94 interacts with kernel 101 (e.g., by way of Application Programming Interface (API) calls) to update RIB 104 based on routing protocol messages received by router 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network.

Routing component 86 also provides an operating environment of one or more traffic engineering protocols to establish tunnels for forwarding subscriber packets through the ordered set of service nodes associated with different service chains. For example, RSVP-TE 95 may execute the Resource Reservation Protocol with Traffic Engineering extensions to exchange traffic engineering (TE) information, such as MPLS labels for enabling label-based packet forwarding. Routing component 86 may, as another example, execute the Label Distribution Protocol 96 to signal MPLS rings and ring LSPs as described herein. As another example, routing component 86 may use GRE or IP-based tunneling protocols to establish traffic engineered tunnels. Routing component 86 may maintain, for example, a traffic engineering database (TED) 109 to store the traffic engineering data.

RSVP-TE 95 may maintain routing communication sessions with peer routers and output control-plane signaling messages, such as resource reservation request messages (e.g., RSVP PATH messages) and resource reservation response messages (e.g., RSVP RESV messages) as described herein to signal membership of ring LSPs (e.g., MP2P ring LSP 24 of FIG. 1). Moreover, RSVP-TE 95 may program RIB 104 and/or FIB 106 with forwarding labels for a MP2P ring LSP as learned from the peer router, which in turn causes kernel 101 to program forwarding ASICS 116 with forwarding entries for forwarding MPLS traffic as described herein. In some examples, RSVP-TE 95 may implement automatic bandwidth management functions for LSP rings based on provisioning information received via CLI 92 or SNMP 93, for example. In addition, or alternatively, LDP 96 may perform these functions. IGP 94 may be extended for auto-discovery of MPLS rings and ring LSPs.

Routing component 86 communicates data representative of a software copy of the FIB 106 into each of PPs 114 to control forwarding of traffic within the forwarding plane. This allows the software FIB stored in memory (e.g., RAM) in each of PPs 114 to be updated without degrading packet-forwarding performance of router 80. In some instances, routing component 86 may derive separate and different software FIBs for each respective PPs 114. In addition, one or more of PPs 114 include application-specific integrated circuits (ASICs 116) that PPs 114 program with a hardware-copy of the FIB based on the software FIBs (i.e., hardware versions of the software FIBs) copied to each respective PPs 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 95 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PPs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PPs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. Example details of an example router in which a processor programs one or more forwarding components are provided in U.S. Pat. No. 7,990,993, the contents of which being incorporated herein by reference in its entirety.

In this example, ASICs 116 are microcode-controlled chipsets (i.e., forwarding circuits) programmably configured by a slave microprocessor executing on each of PPs 114. When forwarding packets, control logic with each ASIC 116 traverses the forwarding information (FIB 106) received from routing component 86 and, upon reaching a FIB entry for the packet (e.g., a leaf node), microcode-implemented control logic automatically selects a forwarding next hop and processes the packets in accordance with the operations defined within the next hop. In this way, ASICs 116 of PPs 114 process packets by performing a series of operations on each packet over respective internal packet forwarding paths as the packets traverse the internal architecture of router 80. Operations may be performed, for example, on each packet based on any of a corresponding ingress interface, an ingress PP 114, an egress PP 114, an egress interface or other components of router 80 to which the packet is directed prior to egress, such as one or more service cards. PPs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PPs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the way a packet is forwarded or otherwise processed by PPs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate packets in accordance with the forwarding information.

Router 80 may include a bandwidth management unit 120 that operates in accordance with the techniques described herein. In some examples in which router 80 may represent transit routers (e.g., routers R1-R9 of FIG. 1) of MP2P ring LSP 24, router 80 may include a bandwidth management unit 120 for modifying an incoming resource reservation request message to include a sender template object that uniquely identifies a request for a change of bandwidth for a segment of the MP2P ring LSP.

For example, in accordance with aspects of the techniques of this disclosure, router 80 may copy an incoming resource reservation request message (e.g., RSVP PATH message in examples where router 80 supports RSVP-TE 95) for a ring LSP and modify the copied RSVP PATH message by using RSVP-TE 95 to construct a sender template object that comprises a sender address of router 80 as a loopback address and a unique LSP identifier (e.g., LSP_ID) that uniquely identifies a request for a change in bandwidth for a segment within MP2P ring LSP 24.

In some examples in which the bandwidth is to be removed, router 80 may send an RSVP PATH message in accordance with RSVP-TE 95 including a new sender template object that indicates a request for zero bandwidth. For example, after bandwidth increase is successful, router 80 has a sender address of router 80 and the sender template object with the LSP identifier that uniquely identifies the previous request for bandwidth. To remove the bandwidth, router 80 may modify an RSVP PATH message to include a new sender template object having a different LSP_ID to indicate that router 80 is requesting for a change in bandwidth to zero bandwidth. In response, each router downstream of router 80 that receives the RSVP RESV message removes the bandwidth previously allocated on the corresponding link.

In examples where router 80 is a downstream router to the requesting router, router 80 may receive the modified resource reservation request message, e.g., an RSVP PATH message in accordance with RSVP-TE 95, from an upstream router that includes one or more a sender template objects. In this case, bandwidth management unit 120 of router 80 may determine whether links of router 80 have reservable bandwidth available for the requests corresponding to the one or more sender template objects. For example, bandwidth management unit 120 may determine if a link of router 80 can support the requests from one or more sender template objects of the resource reservation request message.

In response to determining that links of router 80 have insufficient reservable bandwidth for a corresponding sender template object, bandwidth management unit 120 may generate an error message. For example, bandwidth management unit 120 may use RSVP-TE 95 to generate an RSVP PathErr message including the sender template object that specified the failed bandwidth request. Router 80 may then send the RSVP PathErr message to the router that sent the request.

In response to determining that links of router 80 have reservable bandwidth available for the sender template objects in the resource reservation request message, bandwidth management unit 120 may send the resource reservation request message towards an egress router of MP2P ring LSP 24.

In an example where router 80 is an egress router, router 80 may receive the modified resource reservation request message, e.g., an RSVP PATH message in accordance with RSVP-TE 95, from an upstream router that includes one or more sender template objects. In response, bandwidth management unit 120 may generate a resource reservation response message, e.g., an RSVP RESV message in accordance with RSVP-TE 95, including the information from the resource reservation request message. For example, bandwidth management unit 120 may use RSVP-TE 95 to generate an RSVP RESV message including a flow descriptor object corresponding to each of the sender template objects in the incoming RSVP PATH message. The flow descriptor object may include a filter specification object that corresponds to the one or more sender template objects of the incoming RSVP PATH message, and a flow specification object that defines the amount of requested bandwidth.

The architecture of router 80 illustrated in FIG. 2 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, processing circuitry, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 3A:
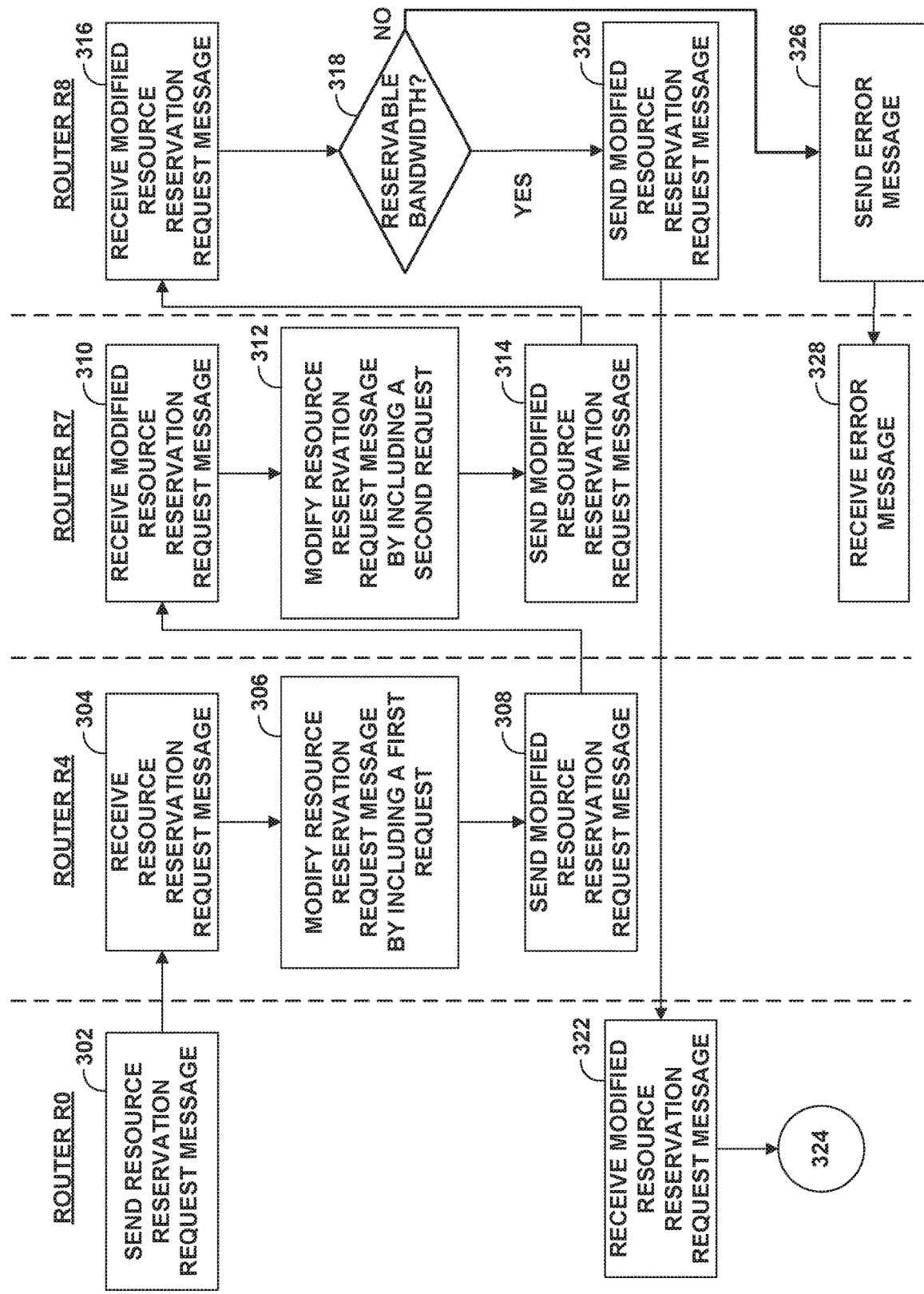
FIG. 3A is a flowchart illustrating example operation of network devices in accordance with aspects of the techniques described herein.

FIG. 3A is a flowchart illustrating an example operation of a network device, such as a router, in accordance with aspects of the techniques described herein. FIG. 3A is described with respect to routers R2, R4, R7, and R8 of FIG. 1 and router 80 of FIG. 2. Although FIG. 3A is described for purposes of example with respect to routers R2, R4, R7, and R8 of FIG. 1, the flowchart is applicable to any router in a ring network.

Router R0, operating as an ingress, may send a resource reservation request message, e.g., RSVP PATH message, to establish an MP2P ring LSP (302). For example, router R0 may signal an RSVP PATH message in a downstream direction (i.e., clockwise) that contains the address of router R0 in a field (e.g., session object) of the RSVP PATH message such that the RSVP PATH message is addressed to router R0 of the MP2P ring LSP. In the example of FIG. 3A, zero bandwidth is requested from routers R0-R3. In this example, router R0 originates an RSVP PATH message including a sender template object having a sender address of router R0 and unique LSP identifier (e.g., LSP_ID=1) that specifies a request for bandwidth and a TSPEC object specifying a request for zero bandwidth. Routers R1-R3 may each receive the RSVP PATH message and include a respective sender template object with a sender address of itself, and LSP_ID=1 to specify zero bandwidth is requested from router R0-R3.

In the example of FIG. 3A, router R4 may request a change in bandwidth for a segment on MP2P ring LSP from router R4 to egress router R0. Router R4 receives the resource reservation request message (304) and modifies the incoming resource reservation request message by including a first sender template object (306). For example, router R4 may request an increase in bandwidth, e.g., 1 gigabyte, for the segment on MP2P ring LSP from router R4 to egress router R0. Bandwidth management unit (e.g., bandwidth management unit 120 of FIG. 2) of router R4 may copy the incoming RSVP PATH message and modify the copied RSVP PATH message to include a sender template object (i.e., the first sender template object) having a sender address of router R4 as a loopback address and an LSP identifier that is different than the LSP identifier included in the RSVP PATH message by routers R0-R3. The presence of a different LSP identifier in the RSVP PATH message may uniquely identify the request for a change in bandwidth for a segment of the MP2P ring LSP. Router R4 may also modify a TSPEC object to specify the amount of bandwidth requested, i.e., 1 gigabyte.

Router R4 may send the modified resource reservation request message a downstream neighbor on MP2P ring LSP (308). As each downstream router receives the modified resource reservation request message, the downstream router may include a sender template object having the unique LSP identifier of the first sender template object. Each downstream router may also determine whether the router has reservable bandwidth available for the requests. For ease of illustration, these steps are discussed with respect to router R8 below, but may similarly be performed by any of routers R0-R9.

In the example of FIG. 3A, router R7 may also request for bandwidth on the MP2P ring LSP to send traffic to egress router R0. Router R7 receives the modified resource reservation request message (310) and modifies the incoming resource reservation request message by including a second sender template object (312). For example, router R7 may request an increase in bandwidth, e.g., 2 gigabytes, for a segment on MP2P ring LSP from router R7 to egress router R0. Bandwidth management unit (e.g., bandwidth management unit 120 of FIG. 2) of router R7 may copy the incoming RSVP PATH message and modify the copied RSVP PATH message to include a sender template object (i.e., the second sender template object) having a sender address of router R7 as a loopback address and an LSP identifier that is different than the LSP identifier that was included in the RSVP PATH message by routers R0-R6. The presence of a different LSP identifier in the RSVP PATH message may uniquely identify a different request for a change in bandwidth is made for a segment of the MP2P ring LSP from router R7 to egress router R0. Router R7 may also modify a TSPEC object to specify the amount of bandwidth requested, e.g., 2 gigabytes.

Router R7 may send the modified resource reservation request message a downstream neighbor on MP2P ring LSP (314). As each downstream router receives the modified resource reservation request message, the downstream router may include a sender template object having the unique LSP identifier of the first and second sender template object.

Router R8 may receive the modified resource reservation request message (316), i.e., from upstream neighbor router R7, and determine if router R8 has reservable bandwidth available for the bandwidth requests (318). For example, router R8 may determine whether one or more links of router R8 have reservable bandwidth available for the requests. In response to determining that there is reservable bandwidth available for one or more bandwidth requests ("YES" branch of 318), router R8 may send the modified resource reservation request message downstream toward egress router R0 (320). In some examples, router R8 may forward a resource reservation request message including only accepted sender template objects.

In response to determining that there is insufficient reservable bandwidth for one or more bandwidth requests ("NO" branch of 318), router R8 may send an error message (e.g., RSVP PathErr message) including the sender template object that corresponds to the failed bandwidth request (326) to the router that made the request, i.e., router R7. Router R7 may receive the error message (328) and determine that the bandwidth request has failed.

If all the routers to egress router R0 have reservable bandwidth available for the one or more requests, egress router R0 receives the modified resource reservation request message (322). In the example of FIG. 3A, downstream routers R8-R9 have reservable bandwidth available for the requests for a change in bandwidth and may send the modified resource reservation request message to egress router R0. In response to receiving the modified resource reservation request message, egress router R0 may send a resource reservation response message (e.g., RSVP RESV message) upstream following the path state created by the resource reservation request message, in reverse order back to router R0 (324), as further described in FIG. 3B.

Figure 3B:
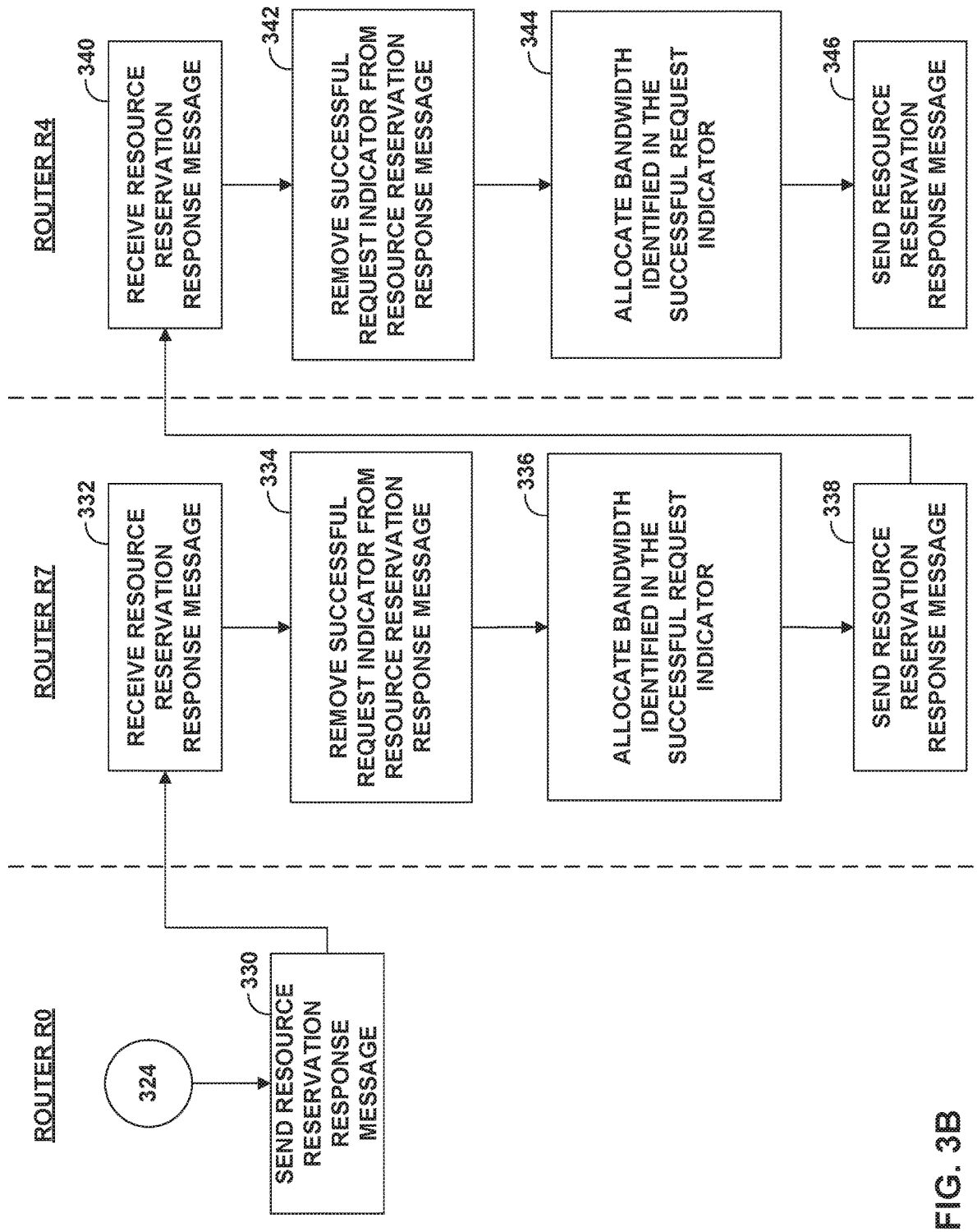
FIG. 3B is a continuation of the flowchart of FIG. 3A, in accordance with aspects of the techniques described herein.

FIG. 3B is a continuation of the flowchart of FIG. 3A, in accordance with aspects of the techniques described herein. In response to receiving a modified resource reservation request message, egress router R0 sends a resource reservation response message (e.g., RSVP RESV message) upstream following the path state created by the resource reservation request message, in reverse order back to router R0 (330). For example, egress router R0 sends an RSVP RESV message including one or more successful request indicators such as one or more filter specification objects corresponding to the sender template objects received from the RSVP PATH message. The successful request indicator may also include flow specification objects specifying the requested bandwidths indicated by the TSPEC objects received from the RSVP PATH message.

As each upstream router receives the resource reservation response message, the router removes a successful request indicator corresponding to the router. For example, router R7 may receive the resource reservation response message (332), i.e., from downstream neighbor router R8, that includes a successful request indicator corresponding to router R7 and removes the successful request indicator from the RSVP RESV message (334). The successful request indicator may include a filter specification object and a flow specification object corresponding to the sender template object that was sent by router R7. Router R7 may allocate the bandwidth identified in the successful request indicator (336). For example, router R7 may determine the bandwidth defined in the flow specification object and may allocate the bandwidth. Router R7 may send the resource reservation response message to its upstream neighbor (338).

Router R4 may receive the resource reservation response message (340), i.e., from downstream neighbor router R5, that includes a successful request indicator corresponding to router R4 and removes the successful request indicator corresponding to router R4 (342). The successful request indicator may include a, filter specification object and a flow specification object corresponding to the sender template object that was sent by router R4. Router R4 may allocate the bandwidth identified in the successful request indicator (344). For example, router R4 may determine the bandwidth defined the flow specification object and may allocate the bandwidth. Router R4 may send the resource reservation response message to its upstream neighbor (346). In this way, routers R4 and R7, and their downstream routers, may allocate respective bandwidths for the corresponding requests for a change in bandwidth as indicated by sender template objects included in a resource reservation request message.

Figure 4:
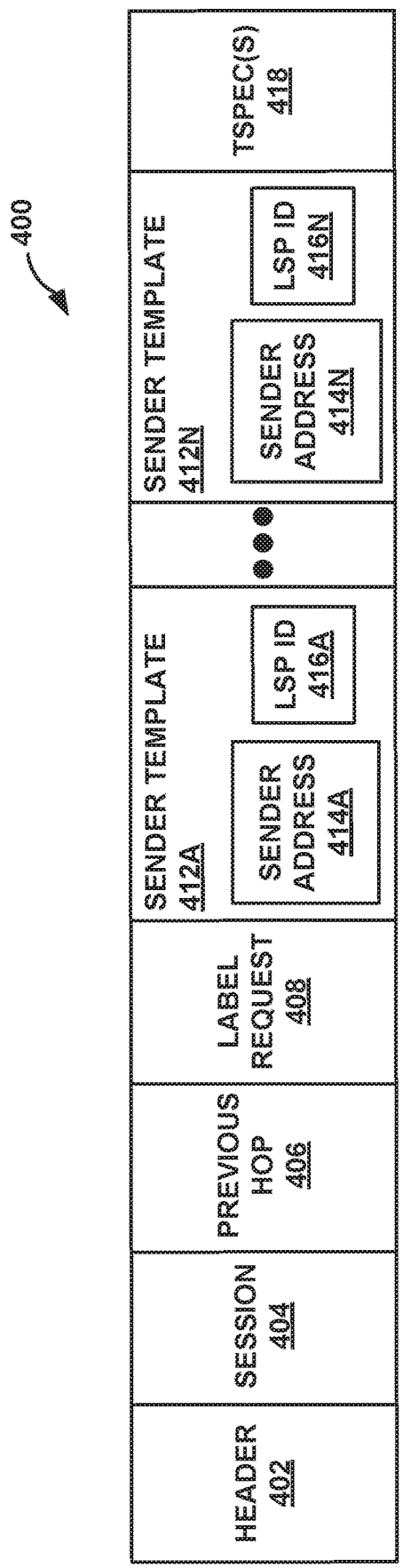
FIG. 4 is a block diagram illustrating an example resource reservation request message, in accordance with aspects of techniques described herein.

FIG. 4 is a block diagram illustrating an example resource reservation request message 400, in accordance with aspects of techniques described herein. In the example of FIG. 4, resource reservation request message 400 may include a header 402, session object 404, previous hop object 406, label request object 408, one or more sender descriptor objects 412A-412N (collectively, "sender template objects 412), and one or more TSPEC objects 418. FIG. 4 is merely one example of a resource reservation request message 400, and may include more or less objects with the sender descriptor object 412 in other examples.

Header 402 may include information identifying the message type (i.e., RSVP PATH), length of the message in bytes, protocol version, a time-to-live value, and any flags. Session object 404 may uniquely define the traffic engineered tunnel. Session object 404 may, in this example, differentiate ring LSPs from traditional LSPs. For example, session object 404 may include a ring ID, ring anchor node address, ring instance ID, and ring flags that indicate the ring direction (i.e., clockwise or counter-clockwise) for the ring LSP. Previous hop object 406 may include the IP address of the previous hop for a downstream message. Label request object 408 may indicate that a label binding for the label switched path is requested and also provides an indication of the network layer protocol that is to be carried over this path. Additional examples of the objects in a resource reservation request message is described in R. Braden, Ed, et. al., "Resource ReSerVation Protocol (RSVP), Request for Comments 2205, September 1997, and D. Awduche, et. al., "RSVP-TE: Extensions to RSVP for LSP Tunnels," Request for Comments 3209, December 2001, the entire contents of both of which are incorporated by reference herein.

Resource reservation request message 400 may also include a sender descriptor object 410 that indicates one or more requests for a change in bandwidth. In some examples, resource reservation request message 400 may include one or more sender template objects 412A-412N (collectively, "sender template objects 412") and one or more traffic specification (TSPEC) objects 418 that defines the traffic characteristics of the data flow that the sender generates. TSPEC objects contain the amount of bandwidth to be reserved for the corresponding sender template. Each of the sender template objects 412 may indicate a request for a change in bandwidth to a segment of the MP2P ring LSP. Each of the sender template objects 412 may include, for example, a sender address 414A-414N, respectively, identifying the router requesting for a change in bandwidth and a unique LSP identifier 416A-416N ("LSP ID 416"), respectively, that uniquely identifies the respective request for a change in bandwidth for a particular segment of MP2P ring LSP 24. Each of the TSPEC objects 418 may define an amount of requested bandwidth corresponding to a respective one of sender template objects 412.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

Various examples have been described. These and other examples are within the scope of the following claims.

What is claimed is:

1. A method comprising:
   receiving, by a network device and from an egress network device of a ring network, a resource reservation request message to establish a multipoint-to-point (MP2P) ring label switched path (LSP), wherein the resource reservation request message comprises a first sender template object specifying a first request for a first amount of bandwidth for a first segment of the MP2P ring LSP;
   modifying, by the network device, the resource reservation request message to further comprise a second sender template object specifying a second request for a second amount of bandwidth for a second segment from the network device to the egress network device of the MP2P ring LSP, wherein the second amount of bandwidth is different from the first amount of bandwidth, such that the second segment of the MP2P ring LSP has a different amount of bandwidth than the first segment of the MP2P ring LSP; and
   sending, by the network device and to a downstream network device along the MP2P ring LSP, the modified resource reservation request message.

2. The method of claim 1, wherein the second amount of bandwidth for the second segment is specified in a traffic specification object, wherein the traffic specification object is associated with the second sender template object.

3. The method of claim 1, further comprising:
   in response to determining that the second request for the second amount of bandwidth for the second segment of the MP2P ring LSP has altered, modifying, by the network device, the resource reservation request message to replace the second sender template object with a third sender template object specifying a different amount of bandwidth for the second segment of the MP2P ring LSP, wherein the third sender template object specifies a third request for a third bandwidth for the second segment of the MP2P ring LSP.

4. The method of claim 1,
   wherein the second sender template object comprises an address of the network device as a loopback address and an LSP identifier that uniquely identifies the second request for the second amount of bandwidth for the second segment of MP2P ring LSP.

5. The method of claim 1, further comprising:
receiving, by the network device and from a downstream network device of the MP2P ring LSP, an error message identifying the second request for the second amount of bandwidth for the second segment of the MP2P ring LSP; and
determining, by the network device and based on the error message, that there is insufficient reservable bandwidth for the second request for the second amount of bandwidth for the second segment of the MP2P ring LSP.

6. The method of claim 5, wherein receiving the error message identifying the second request for the second amount of bandwidth for the second segment of the MP2P ring LSP comprises receiving the error message including a sender template object that specifies the second request for the second amount of bandwidth for the second segment of MP2P ring LSP.

7. The method of claim 1, further comprising:
receiving, by the network device and from the egress network device of the MP2P ring LSP, a resource reservation response message, wherein the resource reservation response message includes a successful request indicator that indicates the second request is successful and the second amount of bandwidth for the second request; and
removing, by the network device, the successful request indicator from the resource reservation response message;
allocating, by the network device, the second amount of bandwidth according to the second request identified in the successful request indicator; and
sending, by the network device and to an upstream network device along the MP2P ring LSP, the resource reservation response message.

8. The method of claim 7, wherein the successful request indicator comprises:
a filter specification object corresponding to a sender template object included in the resource reservation request message, the sender template object specifying the second request for the second amount of bandwidth for the second segment of the MP2P ring LSP; and
a flow specification object that identifies the second amount of bandwidth for the second request.

9. The method of claim 7,
wherein the resource reservation request message comprises a Resource Reservation Protocol (RSVP) path message, and
wherein the resource reservation response message comprises a RSVP reservation message.

10. The method of claim 1, further comprising:
sending, by the network device and in response to determining that bandwidth is no longer needed for the second segment of the MP2P ring LSP, a new resource reservation request message including a request for zero bandwidth for the second segment of the MP2P ring LSP.

11. A method comprising:
receiving, by an egress network device of a ring network, a resource reservation request message including a plurality of sender template objects to establish a multipoint-to-point (MP2P) ring label switched path (LSP), wherein the plurality of sender template objects comprises a first sender template object specifying a first request for a first amount of bandwidth for a first segment of the MP2P ring LSP and a second sender template object specifying a second request for a second amount of bandwidth for a second segment of the MP2P ring LSP; and
sending, by the egress network device, a resource reservation response message, wherein the resource reservation response message comprises a plurality of reservable bandwidth indicators that indicates the plurality of requests for bandwidth were successful and to cause the first segment of the MP2P ring LSP and the second segment of the MP2P ring LSP to have different amounts of bandwidth.

12. The method of claim 11, wherein sending the resource reservation response message comprises sending the resource reservation response message including a plurality of filter specification objects corresponding to the plurality of sender template objects, and a plurality of flow specification objects that identify the plurality of requests for bandwidth.

13. The method of claim 11, wherein receiving the resource reservation request message comprises:
receiving, by the egress network device and from a first network device of the ring network, the first request for the first amount of bandwidth for the first segment of the MP2P ring LSP from the first network device to the egress network device; and
receiving, by the egress network device and from a second network device of the ring network, the second request for the second amount of bandwidth for the second segment of the MP2P ring LSP from the second network device to the egress network device.

14. A network device comprising:
a plurality of physical interfaces for receiving traffic from two or more network devices of a plurality of network devices in a ring network; and
one or more processors configured to:
receive, from an egress network device of the ring network, a resource reservation request message to establish a multipoint-to-point (MP2P) ring label switched path (LSP), wherein the resource reservation request message comprises a first sender template object specifying a first request for a first amount of bandwidth for a first segment of the MP2P ring LSP;
modify the resource reservation request message to further comprise a second sender template object specifying a second request for a second amount of bandwidth for a second segment from the network device to the egress network device of the MP2P ring LSP, such that the second segment of the MP2P ring LSP has a different amount of bandwidth than the first segment of the MP2P ring LSP; and
send the modified resource reservation request message to a downstream network device along the MP2P ring LSP.

15. The network device of claim 14, wherein the second sender template object comprises an address of the network device as a loopback address and an LSP identifier that uniquely identifies the second request for the second amount of bandwidth for the second segment of MP2P ring LSP.

16. The network device of claim 14, wherein the one or more processors are further configured to:
receive, from the egress network device of the MP2P ring LSP, a resource reservation response message, wherein the resource reservation response message includes a successful request indicator that indicates the second request is successful and the second amount of bandwidth for the second request; and remove, in response to determining that a filter specification object corresponds to the second sender template object, the filter specification object and a flow specification object from the resource reservation response message, the flow specification object identifying the second amount bandwidth for the second request;

allocate, based on the filter specification object and the flow specification object, the second amount of bandwidth; and send the resource reservation response message to an upstream network device along the MP2P ring LSP.

\* \* \* \* \*